(12) United States Patent
Murahashi et al.

(10) Patent No.: US 8,553,243 B2
(45) Date of Patent: Oct. 8, 2013

(54) INKJET PRINTER, INK BILLING SYSTEM, AND INKJET PRINTER CONTROL METHOD

(75) Inventors: Kenichi Murahashi, Nagano-ken (JP); Hiroyuki Motoyama, Nagano-ken (JP); Toshiaki Koike, Nagano-ken (JP)

(73) Assignee: Seiko Epsoh Corporation, Tokyo (JP)

( * ) Notice: Subject to any disclaimer, the term of this patent is extended or adjusted under 35 U.S.C. 154(b) by 1616 days.

(21) Appl. No.: 11/624,558

(22) Filed: Jan. 18, 2007

(65) Prior Publication Data

US 2007/0177197 A1 Aug. 2, 2007

(30) Foreign Application Priority Data

Jan. 27, 2006 (JP) ................................. 2006-019871
Jan. 27, 2006 (JP) ................................. 2006-019873
Oct. 13, 2006 (JP) ................................. 2006-280560

(51) Int. Cl.
*G06K 15/00* (2006.01)

(52) U.S. Cl.
USPC ............ 358/1.14; 358/1.15; 358/1.16; 347/5; 347/6; 347/7; 347/9; 347/19; 347/81

(58) Field of Classification Search
None
See application file for complete search history.

(56) References Cited

U.S. PATENT DOCUMENTS

| | | | |
|---|---|---|---|
| 5,869,824 A | 2/1999 | Okada et al. | |
| 6,025,925 A | 2/2000 | Davidson, Jr. et al. | |
| 6,155,664 A * | 12/2000 | Cook ................................ | 347/7 |
| 6,168,268 B1 * | 1/2001 | Sugiyama ....................... | 347/89 |
| 6,571,071 B2 | 5/2003 | Kanoshima et al. | |
| 7,280,258 B2 | 10/2007 | Kitahara et al. | |
| 2002/0165833 A1 | 11/2002 | Minowa et al. | |
| 2004/0085565 A1 * | 5/2004 | Owen et al. ................... | 358/1.14 |
| 2004/0145772 A1 * | 7/2004 | Stringham .................... | 358/1.15 |
| 2004/0186801 A1 | 9/2004 | Morita | |
| 2005/0039091 A1 * | 2/2005 | Hanaoka ....................... | 714/724 |
| 2005/0080750 A1 * | 4/2005 | Carling et al. ................ | 705/400 |
| 2005/0168765 A1 * | 8/2005 | Akune et al. ................. | 358/1.13 |
| 2006/0077216 A1 * | 4/2006 | Sukigara .......................... | 347/7 |
| 2006/0203277 A1 * | 9/2006 | Suzuki ......................... | 358/1.14 |

FOREIGN PATENT DOCUMENTS

| | | |
|---|---|---|
| JP | 09120345 | 5/1997 |
| JP | 09-309247 | 12/1997 |
| JP | 10-021023 | 1/1998 |
| JP | 2000-309147 | 11/2000 |
| JP | 2000309147 | 11/2000 |
| JP | 2001-022546 | 1/2001 |
| JP | 2001-063189 | 3/2001 |
| JP | 2001-125763 | 5/2001 |
| JP | 2001175622 | 6/2001 |

(Continued)

*Primary Examiner* — Benjamin O Dulaney

(57) ABSTRACT

A printer and printer control method can report information about ink consumption to the host computer. The printer 100 is in communication with a host computer 300, and prints according to print jobs sent from the host computer 300. The printer 100 has a job data memory 190 for storing information about each print job. A receiver 110 receives the print jobs from the host computer 300. A print controller 150 controls printing on paper using a predetermined ink according to the print job. A printing evaluator 175 evaluates the result of printing a print job. A ink shot count converter 170 calculates the number of ink shots used to print the print job. A job data manager 180 stores the job ID for the print job and the ink shot count used to print the print job linked to the print result determined for printing the print job in the job data memory 190.

15 Claims, 8 Drawing Sheets

(56) References Cited

FOREIGN PATENT DOCUMENTS

| | | |
|---|---|---|
| JP | 2002019212 | 1/2002 |
| JP | 2002-149382 | 5/2002 |
| JP | 2002-174995 | 6/2002 |
| JP | 2002-304281 | 10/2002 |
| JP | 2002-307789 | 10/2002 |
| JP | 2002304268 | 10/2002 |
| JP | 2002304281 | 10/2002 |
| JP | 2003228474 | 8/2003 |
| JP | 2003228475 | 8/2003 |
| JP | 2004-094554 | 3/2004 |
| JP | 2004-262232 | 9/2004 |
| JP | 2004-287665 | 10/2004 |
| JP | 2004-302178 | 10/2004 |
| JP | 2005-014586 | 1/2005 |
| JP | 2005-022298 | 1/2005 |
| JP | 2005-161731 | 6/2005 |
| JP | 2005-274858 | 10/2005 |
| JP | 2006-021369 | 1/2006 |
| JP | 2008-279647 | 11/2008 |

* cited by examiner

| JOB ID | C | M | Y | PRINTING RESULT |
|---|---|---|---|---|
| 0001 | 423527 | 375222 | 123483 | 0 |
| 0002 | 357234 | 249873 | 127843 | 0 |
| 0003 | 357234 | 249873 | 127843 | 0 |
| 0004 | 632742 | 323432 | 234321 | 1 |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

FIG. 3

| JOB ID | DEVICE ID | C | M | Y | PRINTING RESULT |
|---|---|---|---|---|---|
| 0001 | H00003 | 423527 | 375222 | 123483 | 0 |
| 0002 | H00002 | 357234 | 249873 | 127843 | 0 |
| 0003 | H00002 | 357234 | 249873 | 127843 | 0 |
| 0004 | H00004 | 632742 | 323432 | 234321 | 1 |

FIG. 7

INKJET PRINTER, INK BILLING SYSTEM, AND INKJET PRINTER CONTROL METHOD

RELATED APPLICATIONS

Japanese patent application No.(s) 2006-019871, 2006-019873, and 2006-280560 are hereby incorporated by reference in their entirety.

BACKGROUND OF THE INVENTION

1. Field of the Invention

The present invention relates generally to an inkjet printer, an ink billing system, and to a control method for an inkjet printer, and relates more particularly to an inkjet printer that can appropriately determine how much ink was used as a consumable for printing and can be used to form an ink billing system.

2. Description of the Related Art

Inkjet printers are generally used as image recording devices for recording images containing text and pictures, for example, on plain paper or other type of printing paper by depositing ink on the paper. An ink cartridge filled with ink is removably installed in this type of image recording device. When printing has consumed all available ink in the ink cartridge, a new cartridge can be installed to replenish the ink supply.

From the user's perspective, printing that consumes a large amount of ink is undesirable because of the operating cost, and printing using the least amount of ink while achieving the greatest expressive effect is therefore desirable. Depending upon the image data, high quality images can be printed using a small amount of ink. Simply changing the background from a dark color to a light color, for example, can reduce ink consumption while retaining high print quality without greatly changing the impression of the printed image.

As a way of reducing printing costs, Japanese Unexamined Patent Appl. Pub. JP-A-2003-228474 describes a printing system that, when a print job is received from the host computer, converts the print job to the print data that is required for printing by the print engine, estimates the total job cost required to print the print job using the print engine, and sends this estimated total job cost back to the host computer. The host computer in this printing system then presents this total job cost to the user and instructs the printing system to print the job only if the user asserts a print command.

Japanese Unexamined Patent Appl. Pub. JP-A-2003-228475 describes a printer that stores toner consumption and paper consumption data for each print job, calculates printer usage during a predetermined period for each user name, which is contained in each print job and identifies a particular user, and thus enables invoicing individual users an amount determined by printer usage.

Japanese Unexamined Patent Appl. Pub. JP-A-9-120345 describes a printer that stores the average toner consumption per pixel and the average pixel count per page in non-volatile memory, and has a function for calculating toner use from the number of pages actually printed and the number of pixels in the printed images.

Japanese Unexamined Patent Appl. Pub. JP-A-2001-175622 describes displaying detailed print job information including the status of the reception process, the print image conversion process, and the printing process for each print job, the host device that sent each print job and the communication path used to send the print job, use of consumables for each print job, and the content of any errors that occurred while processing a particular print job.

Japanese Unexamined Patent Appl. Pub. JP-A-2002-019212 describes storing printer status information such as the condition of the print engine, how much memory is available in the receive buffer, whether an error has occurred, and whether printer was successful for each page, and returning this status information to the host computer when requested.

The system described in Japanese Unexamined Patent Appl. Pub. JP-A-2003-228474 has the user confirm for each print job whether or not to proceed with printing. This works well in a relatively slow-paced environment where the printing frequency is not particularly high, but in commercial applications requiring fast, timely output such as issuing tickets, requiring user confirmation for each print job interferes with work.

Billing systems that invoice for ink consumption based on ink usage are available for ticket printing systems. When the same images are repeatedly printed, this type of billing system can preferably calculate ink consumption per ticket so that the user can select the images to be printed on each ticket to reduce the printing cost.

Such billing systems also assume that printing each job that is printed with ink is finished correctly and the output is usable. However, if printing is interrupted for some printer-side reason so that the job is not finished but the billing system charges for the unfinished job as though it was finished, the billing system will obviously seem unfair from the user's perspective.

SUMMARY OF THE INVENTION

An inkjet printer, an ink billing system, and an inkjet printer control method according to the invention can report information relating to ink consumption and/or the printing result to the host computer as needed. In a network environment having a plurality of host computers and inkjet printers connected to each other over a network, the information relating to ink consumption and/or the printing result can also be correctly reported to the host computer of interest.

(1) A first embodiment of the invention is an inkjet printer that is in communication with a host computer and that prints based on a print job sent from the host computer, the inkjet printer including: a job data memory for storing information relating to print jobs; a receiver for receiving the print job from the host computer; a print controller for printing on paper using a predetermined ink according to the print job; an ink shot count converter for calculating the ink shot count used to print the print job; and a job data manager for recording in the job data memory a job ID for the print job and the ink shot count used to print the print job linked to device identification information that is contained in the print job, and identifies a particular host computer that sent the print job.

(2) Preferably, the ink shot count converter separately calculates the ink shot count for each color of ink that is actually discharged for printing based on the dot pattern data generated from the print job.

(3) Yet further preferably, the job data manager sends the ink shot count used for printing to the host computer in response to a job data transmission request received from the host computer.

(4) Yet further preferably, the job data transmission request contains a job ID selection value that specifies a print job; and the job data manager sends the ink shot count linked to the job ID corresponding to the job ID selection value to the host computer.

(5) Yet further preferably, the job data manager sends the ink shot count linked to the job ID and device identification information specified in the job data transmission request to the host computer in response to a job data transmission request received from the host computer.

(6) An inkjet printer according to another embodiment of the invention additionally has a printing evaluator for determining the result of printing a print job, and the job data manager records in the job data memory a job ID for the print job, the ink shot count used to print the print job, and device identification information identifying the host computer that sent the print job linked to the print result determined for the print job.

(7) Further preferably, the ink shot count converter separately calculates the ink shot count for each color of ink that is actually discharged for printing based on the dot pattern data generated from the print job.

(8) Yet further preferably, the job data manager sends the ink shot count used for printing and the print result to the host computer in response to a job data transmission request received from the host computer.

(9) Yet further preferably, the job data transmission request contains a job ID selection value that specifies a print job; and the job data manager sends the ink shot count and print result linked to the job ID corresponding to the job ID selection value to the host computer.

(10) Yet further preferably, the job data manager sends the ink shot count and print result linked to the job ID and device identification information specified in the job data transmission request to the host computer in response to a job data transmission request received from the host computer.

(11) Another embodiment of the invention is an ink billing system for determining an ink shot count and print result using the inkjet printer of the invention, and billing according to the ink shot count, wherein the ink shot count is counted and billed only if the print result is successful.

(12) Another embodiment of the invention is a control method for an inkjet printer that is in communication with a host computer and that prints based on a print job sent from the host computer, the control method comprising: receiving the print job from the host computer; printing on paper using a predetermined ink according to the print job; calculating the ink shot count used to print the print job; and recording information related to each print job in a job data memory, the recorded print job data including a job ID for the print job and the ink shot count used to print the print job linked to device identification information that is contained in the print job, and identifies a particular host computer that sent the print job.

(13) Preferably, the step of calculating the ink shot count separately includes calculating the ink shot count for each color of ink that is actually discharged for printing based on the dot pattern data generated from the print job.

(14) Further preferably, the inkjet printer control method has an additional step of sending the ink shot count used for printing to the host computer in response to a job data transmission request received from the host computer.

(15) Yet further preferably, the job data transmission request contains a job ID selection value that specifies a print job; and the step of sending the ink shot count includes sending the ink shot count linked to the job ID corresponding to the job ID selection value to the host computer.

(16) In another embodiment of the invention the inkjet printer control method also has a step of sending the ink shot count linked to the job ID and device identification information specified in the job data transmission request to the host computer in response to a job data transmission request received from the host computer.

(17) The inkjet printer control method according to another embodiment of the invention also has a step of determining the result of printing a print job, and the step of recording print job information in the job data memory further includes recording a job ID for the print job, the ink shot count used to print the print job, and device identification information identifying the host computer that sent the print job linked to the print result determined for the print job.

(18) Preferably, the step of calculating the ink shot count separately includes calculating the ink shot count for each color of ink that is discharged for printing based on the dot pattern data generated from the print job.

(19) Further preferably, the inkjet printer control method also has a step of sending the ink shot count used for printing and the print result to the host computer in response to a job data transmission request received from the host computer.

(20) Yet further preferably, the job data transmission request contains a job ID selection value that specifies a print job; and the step of sending print job information sends the ink shot count and print result linked to the job ID corresponding to the job ID selection value to the host computer.

(21) Yet further preferably, the step of sending print job information includes sending the ink shot count and print result linked to the job ID and device identification information specified in the job data transmission request to the host computer in response to a job data transmission request received from the host computer.

The inkjet printer and control method of the invention records the ink shot count denoting how much ink was used to print a job and/or the print result each time a print job is received and the print job is printed. The inkjet printer user can therefore reference the print job information recorded inside the inkjet printer as needed to determine the ink shot count required to print a particular job, and determine whether printing succeeded or failed.

When the printer is used for coupon printing, for example, how much ink is used to print a coupon can therefore be determined and the cost of printing each coupon can be known. By thus verifying ink consumption, the inkjet printer of the invention enables a simple operation for selecting images that both reduce the printing cost while retaining the desired expressive impact. If multiple coupons are issued consecutively, for example, and the cost of issuing the coupons is considered high after verifying the ink consumption data recorded in the inkjet printer, the user can reduce the density of the colors in the coupon to reduce ink consumption or change the design of the coupon in order to reduce ink consumption, and the invention can therefore be used with great effect to reduce printing costs.

If the ink cartridge in the inkjet printer contains ink tanks for plural colors of ink, one color of ink may be consumed more rapidly than the other colors of ink, and it may become necessary to replace the ink cartridge even though there is enough ink of the other colors remaining. By determining the ink shot count for each color of ink, the invention can also be used in this situation to select images that prevent depleting one color of ink and the resulting ink waste.

As also described above, the inkjet printer of the invention records the print result denoting whether a job was printed correctly in addition to the ink shot count whenever a print job is received and the print job is printed. The inkjet printer user can therefore refer to the job data records stored in the inkjet printer as needed to determine if printing was completed as required by the print jobs. When the printer is used for coupon printing, for example, the user can therefore know if each coupon was correctly printed as directed.

The job data manager of the inkjet printer according to the invention also sends the ink shot count used for printing to the host computer in response to a job data transmission request received from the host computer. The user can therefore easily retrieve and use the ink shot count data to reduce printing costs by sending a job data transmission request from the host computer to the inkjet printer.

A job ID selection value indicating the print job(s) for which information is to be returned is also contained in the job data transmission request sent to the inkjet printer, and the job data manager sends the ink shot count linked to the job specified by the job ID selection value to the host computer. Even when the printer is used to print different types of jobs, if the correlation between print jobs and the images printed for each print job is known, the user can specify the print job producing the image for which the ink shot count is desired and can obtain the ink shot count required to print the image from the inkjet printer. As a result, print images can be optimized and the printing cost can be reduced for each of the different types of jobs the printer is used to print.

Furthermore, when the inkjet printer according to the invention is used in an ink billing system for invoicing the printer user based on the ink shot count, the ink shot count and print result for each print job can be used together so the user is invoiced based on the ink shot count only when the print result is successful. As a result, the user of the ink billing system will not be invoiced for the ink if printing fails due to a printer-side problem, and the ink billing system can be dependably used for the original purpose of billing for the ink that is actually used.

Alternatively, the job data transmission request sent to the inkjet printer specifies both the device identification information and job ID, and the inkjet printer returns the desired print job information based on the device identification information and job ID. As a result, even if plural host computers send print jobs with the same job ID to the inkjet printer, duplicate job data records will not be stored in the job data memory of the inkjet printer because the device identification information differs and each print job record therefore differs from every other record. Therefore, when a job data transmission request is received from one of the host computers, the inkjet printer will not accidentally return the ink shot count and/or print result information for a print job sent from a different host computer, and the printer of the invention can therefore be used in a network environment to the same effect.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 is a table showing an example of the print job information stored in the job data memory.

FIG. 7 is a table showing an another example of the print job information stored in the job data memory.

DESCRIPTION OF THE PREFERRED EMBODIMENTS

A printer and a printer control method according to a preferred embodiment of the present invention are described below with reference to the accompanying figures.

Figure 1:
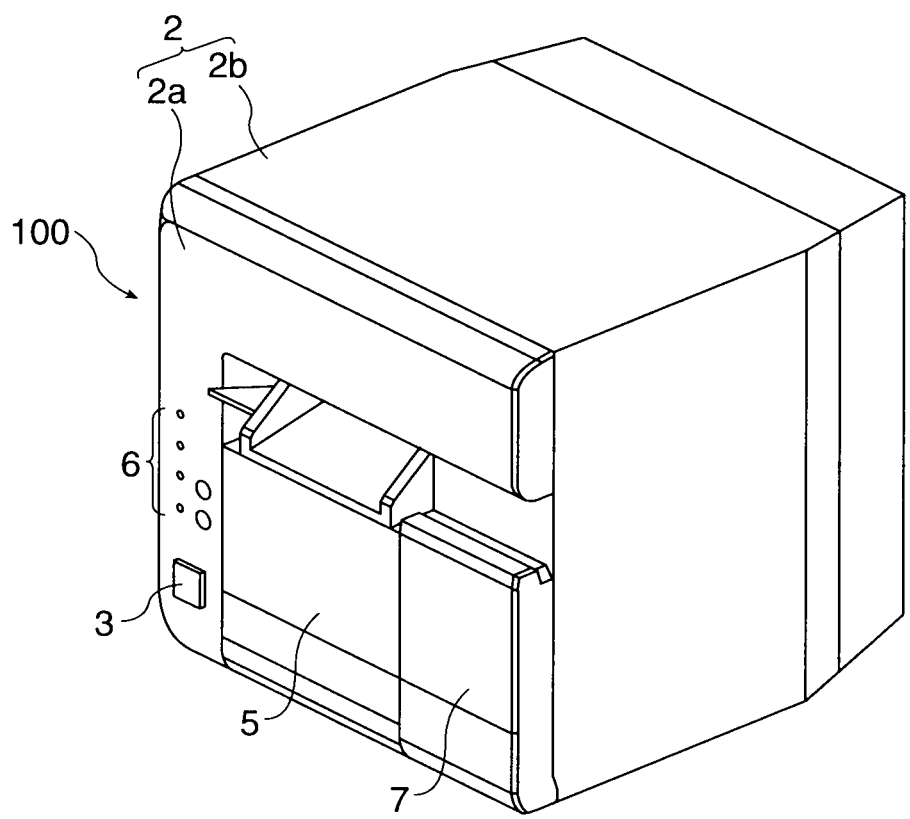
FIG. 1 is an oblique view of a printer according to the invention.

FIG. 1 is an oblique view of a printer according to a first embodiment of the invention.

As shown in FIG. 1, the printer 100 according to this embodiment of the invention is an inkjet printer that uses an inkjet print head to print color coupons, for example, by depositing multiple colors of ink on a recording medium such as paper to render a desired image using a plural number of color inks.

As shown in FIG. 1, the printer 100 has a printer case 2 including a front top panel 2a and a case cover 2b, and a power switch 3, a roll paper cover 5, and an ink cartridge compartment cover 7 disposed from left to right at the front of the printer case 2. A display unit 6 (e.g. LED indicators) for reporting the status of the printer 240 and host computer 220 to the user is provided above the power switch 3. The roll paper cover 5 and ink cartridge compartment cover 7 each pivot to the front to open and close on hinges (not shown) positioned at the bottom part of the covers.

Opening the roll paper cover 5 provides access to the roll paper compartment where the roll paper (not shown) used for printing is held, and opening the roll paper cover 5 allows replacement of the roll paper.

Opening the ink cartridge compartment cover 7 provides access to the ink cartridge compartment so that an ink cartridge (not shown) can be installed into or removed from the ink cartridge compartment.

The ink cartridge, for example, is a package containing three color ink packs for yellow, cyan, and magenta. The printer 100 uses these three color inks to print text and graphics in color on the roll paper.

Figure 2:
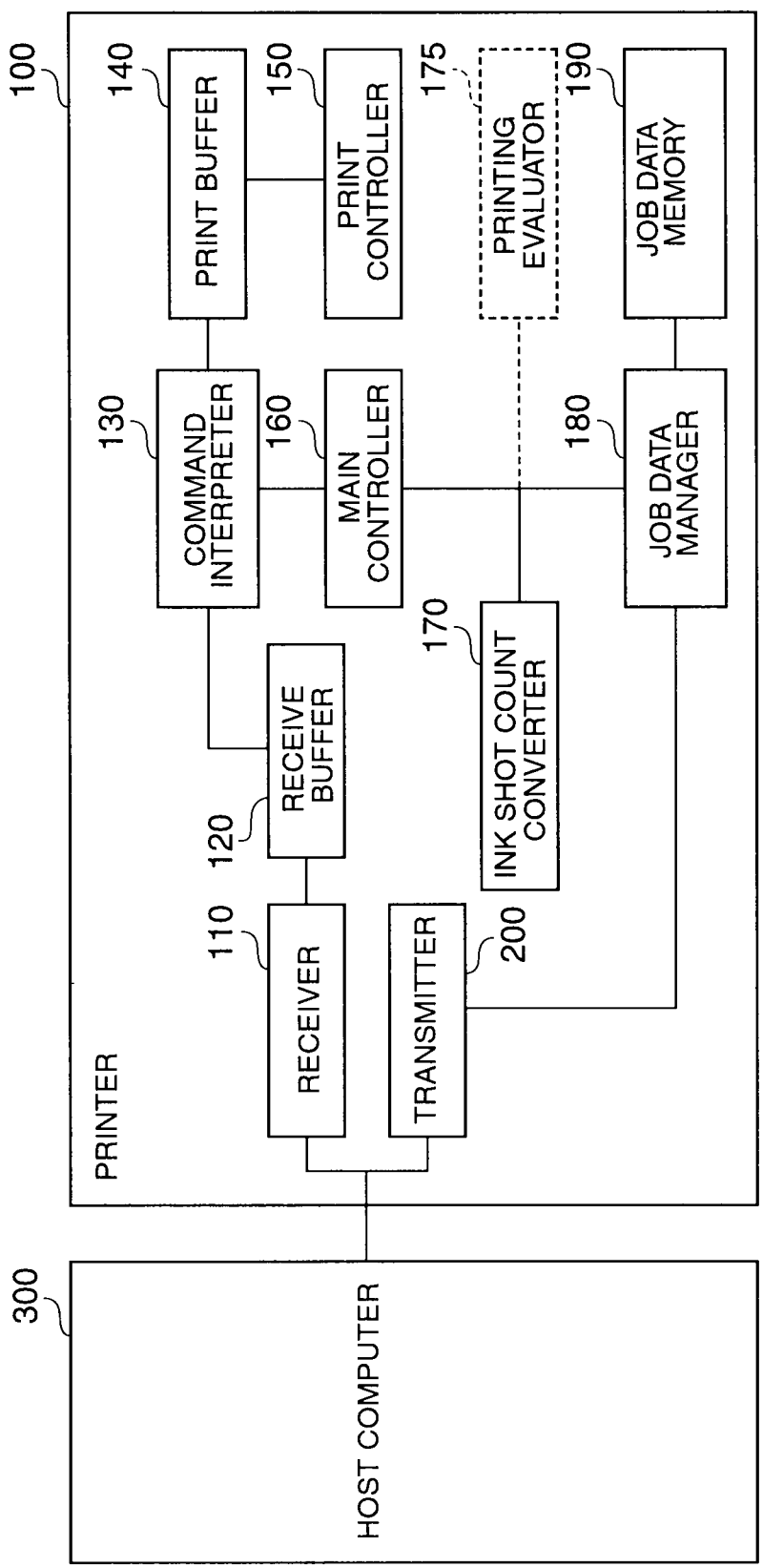
FIG. 2 is a schematic block diagram of the printer according to the invention.

FIG. 2 is a schematic block diagram of the printer 100 according to this embodiment of the invention.

The printer 100 is in communication with the host computer 300 through a serial, parallel, USB, wireless, or other communication interface, and operates in response to commands sent from the host computer 300. In order to print, the host computer 300 sends a print job including the commands controlling the operations needed to print, and data for the image to be printed. A print job ID for uniquely identifying each print job is assigned to each print job. The printer 100 prints one coupon by operating in order to complete one print job.

More specifically, the printer 100 has a receiver 110 for receiving the different commands and print data sent from the host computer 300, and a receive buffer 120 for temporarily storing the commands and print data received by the receiver 110. The data received into the receive buffer 120 is sequentially read and interpreted by the command interpreter 130, any control commands are passed to the main controller 160, and any print data is passed by DMA transfer to the print buffer 140 for storage. Printer 100 communicates with host computer 300 via transmitter 200 to send status and other information, such as ink shot count (to be described later).

The print data temporarily stored in the print buffer 140 is then converted for printing by the print controller 150 to produce and store dot pattern data (print image data) corresponding to the nozzle arrangement of the print head (not shown) and stored in the print buffer 140. This dot pattern data is, for example, 2-bit gray scale data denoting whether the ink discharged from the nozzles of the print head is (1) not discharged or discharged as a (2) small dot, (3) medium dot, or (4) large dot.

The print controller 150 drives the print head based on the dot pattern data stored in print buffer 140 to form an image on the roll paper and create a coupon.

The main controller 160 executes the processes such as advancing the paper a specific distance and cutting the paper indicated by the commands read by the main controller 160.

The shot count analyzing unit (ink shot count converter) 170 is described next.

The ink shot count converter 170 counts the amount of ink discharged from the print head as the number of shots of each color of ink in dot units based on the print data stored in the print buffer 140 or the dot pattern data generated from the print data. The amount of ink discharged from the print head differs according to the size of each dot, that is, whether each dot is small, medium, or large. The ink shot count converter 170 converts each size of dot to a corresponding shot count, and calculates how many shots were discharged. The shot counts calculated by the ink shot count converter 170 are then stored in the job data memory 190 further described below.

The ink shot count converter 170 counts the amount of ink discharged from the print head in order to print the print job, such as printing a coupon, on the roll paper by converting the dot units to the number of shots for each color. The ink shot count converter 170 does not count as part of ink usage the amount of ink consumed to ensure that the print head can discharge ink, including the ink discharged from the print head during nozzle flushing, the ink vacuumed from the print head by an ink suction mechanism not shown, and the ink used for recovering clogged nozzles or priming the ink path when loading a new cartridge. Ink may be left in the ink cartridge when the ink cartridge reaches the ink-end state, and this residual ink is also not counted as part of ink consumption. The ink shot count only includes the number of ink shots actually discharged onto the roll paper for printing.

The printing evaluator 175 is a decision-making unit for deciding if printing a particular print job was a success or a failure. The printing result determined by the printing evaluator 175 is stored in the job data memory 190 described further below.

If printing is a success, all commands that are received between when a print job start command is received to start a print job and a print job stop command is received to end the print job are processed normally, all images in the print job are correctly printed on roll paper, and a ticket is correctly issued.

If printing fails, the commands received between when a print job start command is received to start a print job and a print job stop command is received are either not processed at all or processing is interrupted so that either nothing is printed or printing is interrupted due to the paper running out, the ink running out, a cover being open, or some other fatal error.

The relationship between the ink shot count converter 170 and printing evaluator 175 is described next. The ink shot count converter 170 counts the number of ink shots discharged onto the roll paper, and therefore counts the number of discharged shots even if printing is not completed to the end of the print job. Looking only at the ink shot count calculated by the ink shot count converter 170 will therefore not tell if printing was completed normally to the end of the print job and if the ink consumption contributed to actually issuing a coupon. This embodiment of the invention is therefore arranged so that the printing evaluator 175 verifies that the desired output was printed using the ink that was counted by the ink shot count converter 170.

The job data manager 180 and job data memory 190 are described next.

The job data manager 180 is a controller that records and manages the print jobs sent from the host computer 300 and the number of ink shots used to print each job and the printing result as the print job information linked to each print job.

The job data memory 190 is a storage area where the job data manager 180 records the print job information to build a job information history. The job data memory 190 comprises an EEPROM, flash ROM, or other type of non-volatile storage medium so that the data is not lost when the power turns off.

FIG. 3 shows an example of the print job information stored in the job data memory 190.

The job data manager 180 stores a print job information record for each print job in the job data memory 190. Each print job information record includes at least the print job ID that is contained in each print job, the amount of ink used for the print job, and the success/failure result of printing each print job. In this embodiment of the invention the amount of ink used for the print job is expressed as the ink shot count accumulated by the ink shot count converter 170 for each ink color (specifically cyan (C), magenta (M), and yellow (Y) in this example).

The print result is recorded linked to the corresponding print job ID, and can be recorded using a simple flag that is set to 0 when printing succeeds and set to 1 when printing fails as shown for example in FIG. 3. As will be known from FIG. 3, how much ink of each color was consumed by each print job can be determined from the ink shot counts, and whether the print job ended correctly and a coupon was issued can be verified from the information stored in the job data memory 190.

The print job information recording process is described next with reference to FIG. 4.

Figure 4:
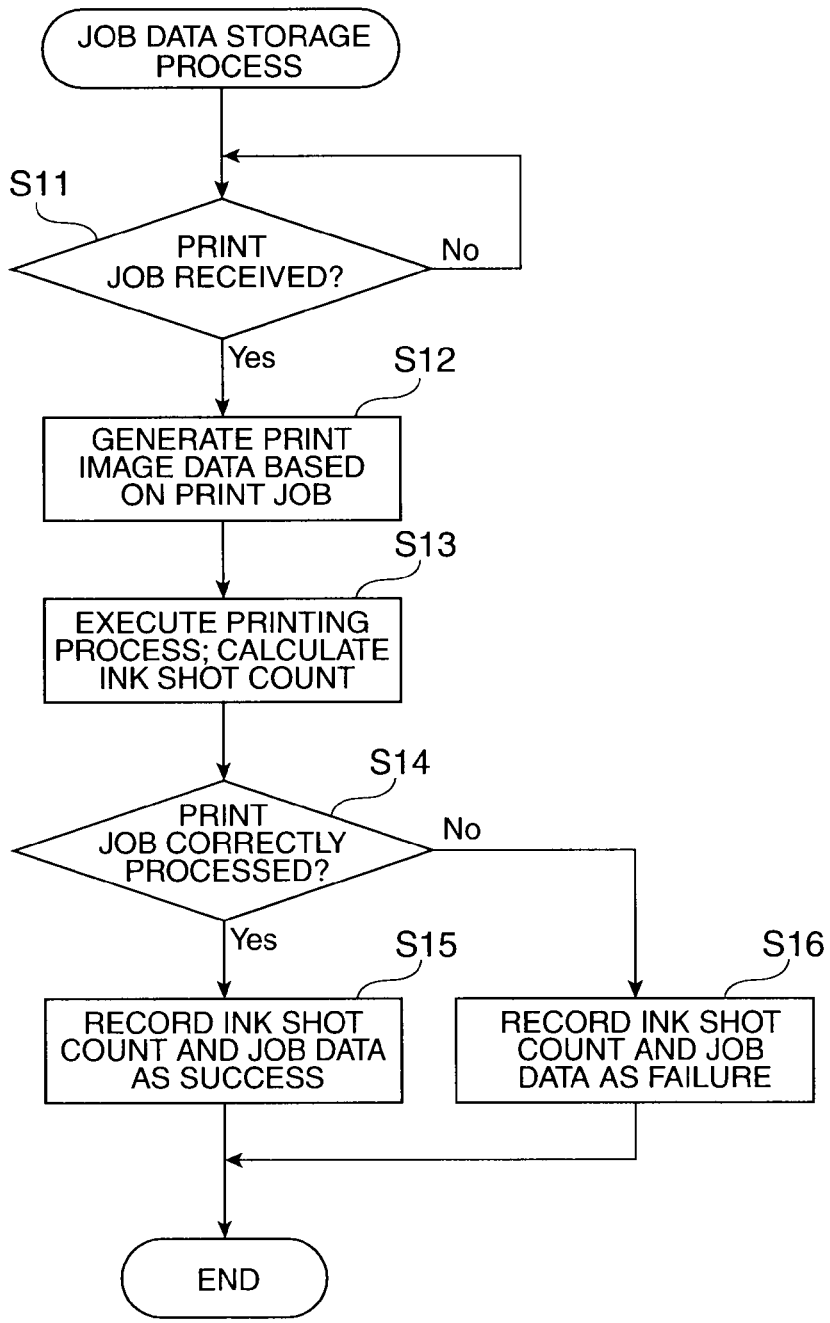
FIG. 4 is a flow chart of the print job information recording process of the invention.

FIG. 4 is a flow chart of the print job information recording process.

The printer 100 waits until the receiver 110 receives a print job sent from the host computer 300 (step S11). Once a print job is received, dot pattern data is generated based on the received print job as the print image data used for printing, and is stored in the print buffer 140 (step S12). The print controller 150 then drives the print head to print on the roll paper (form an image on the paper) according to this dot pattern data and thereby issue a coupon while the ink shot count converter 170 also calculates the ink shot count used for printing based on the dot pattern data (step S13).

The printing evaluator 175 monitors the printing process while referencing the print job to determine if the print job was processed correctly (step S14). If the printing evaluator 175 determines in step S14 that the print job was processed correctly, the job data manager 180 sets the print result flag for the job ID contained in the received print job to 0 in this embodiment to denote that printing was a success, and records the print result flag with the calculated ink shot counts as the print job information in the job data memory 190 (step S15). The job information recording process then ends.

However, if it is determined in step S14 that the print job was not processed correctly, the job data manager 180 sets the print result flag for the job ID contained in the received print job to 1 in this embodiment to denote that printing failed, and records the print result flag with the calculated ink shot counts as the print job information in the job data memory 190 (step S16). The job information recording process then ends.

Each time a print job is printed, this embodiment of the invention thus records how much ink was used for the print job (the ink shot count) and the result of printing the print job together with the print job ID in the printer 100.

The process of sending the print job information to the host computer 300 is described next with reference to FIG. 5.

Figure 5:
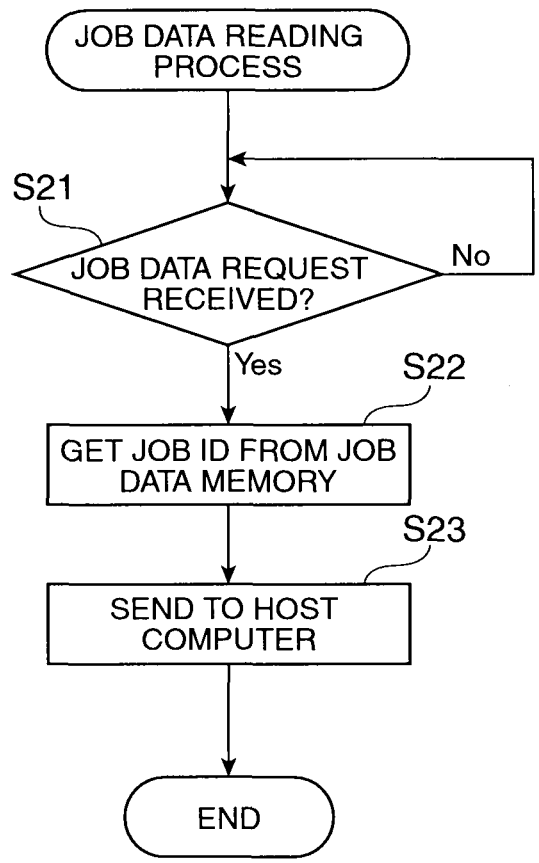
FIG. 5 is a flow chart of the process for sending print job information to the host computer.

FIG. 5 is a flow chart of the process for sending the print job information to the host computer 300.

The printer 100 waits until the receiver 110 receives a print job information request sent from the host computer 300 (step S21). This print job information request includes a job ID selection value denoting (1) the print job ID for a particular print job or (2) a value denoting all print jobs. When the printer 100 receives a print job information request in step S21, the job data manager 180 reads (step S22) and sends (step S23) to the host computer 300, via transmitter 200, either the individually specified print job ID and the corresponding ink shot count information and print result value, or all print job IDs, corresponding ink shot counts, and print result values, depending on the job ID selection value in the print job information request. The printer 100 can delete the print job IDs, ink shot counts, and print results that are sent to the host computer, or the printer 100 can retain the print job information in the job data memory 190 until memory capacity is reached and then delete the print job information sequentially from oldest to newest as needed.

When a print job information request is received, this embodiment of the invention thus sends the ink shot count and print result for the print job specified by the print job information request from the printer 100 to the host computer 300 via transmitter 200.

As described above, the printer 100 according to this embodiment of the invention is in communication with the host computer 300 and prints according to print jobs sent from the host computer 300. The printer 100 has a job data memory 190 for storing certain information about each print job, a receiver 110 for receiving the print jobs from the host computer 300, a print controller 150 for printing with ink on paper according to the print job, a shot count analyzing unit (ink shot count converter) 170 for calculating how much ink is used for each print job, a printing evaluator 175 for evaluating the result of printing each print job, and a job data manager 180 for recording a print job information record in the job data memory 190 for each print job. Each print job information record in this embodiment of the invention includes the job ID of the print job, the ink shot count denoting how much ink was used to print the print job, and the print result denoting if printing the print job was successful.

Each time a print job is received and printed, the printer 100 according to this embodiment of the invention can thus record the number of ink shots used to print the job and the result of printing. The printer 100 user can therefore know the ink shot count used for printing and whether printing succeeded or failed by referring as needed to the information stored inside the printer 100.

When the printer 100 is used for printing coupons, for example, how much ink is used to print a particular coupon can be determined so that the cost of issuing each coupon can be known. By thus verifying ink consumption, the printer 100 according to this embodiment of the invention enables a simple operation for selecting images that both reduce the printing cost while retaining the desired expressive impact. If multiple coupons are issued consecutively, for example, and the cost of issuing the coupons is considered high after verifying the ink consumption data recorded in the printer 100, the user can reduce the density of the colors in the coupon to reduce ink consumption or change the design of the coupon in order to reduce ink consumption, and the invention can therefore be used with great effect to reduce printing costs.

As also described above, the printer 100 according to this embodiment of the invention records the print result denoting whether a job was printed correctly in addition to the ink shot count whenever a print job is received and the print job is printed. The printer 100 user can therefore refer to the job data records stored in the printer 100 as needed to determine if printing was completed as required by the print jobs. When the printer is used for coupon printing, for example, the user can therefore know if each coupon was correctly printed as directed.

Furthermore, when the printer 100 according to the present invention is used in an ink billing system for invoicing the printer user based on the ink shot count, the ink shot count and print result for each print job can be used together so the user is invoiced based on the ink shot count only when the print result is successful. As a result, the user of the ink billing system will not be invoiced for the ink if printing fails due to a printer-side problem, and the ink billing system can be dependably used for the original purpose of billing for the ink that is actually used.

In the printer 100 according to this embodiment of the invention the print controller 150 controls an inkjet print head to discharge plural colors of ink to form images, and the ink shot count converter 170 calculates the ink shot count for each of the plural colors of ink discharged based on the dot pattern data generated for the print job.

If the ink cartridge in the printer 100 contains ink tanks for plural colors of ink, one color of ink may be consumed more rapidly than the other colors of ink, and it may become necessary to replace the ink cartridge even though there is enough ink of the other colors remaining. By determining the ink shot count for each color of ink, this arrangement of the present invention can also be used in this situation to select images that prevent such one-sided consumption of ink.

Furthermore, because the ink shot count can be precisely determined for each color of ink, the ink billing system can set a different unit price for each color and can accurately invoice for ink consumption without error.

The job data manager 180 of the printer 100 according to this embodiment of the invention also sends the ink shot count and print result information to the host computer 300 in response to a job data transmission request received from the host computer 300. The user can therefore easily retrieve and use the ink shot count information to reduce printing costs by sending a job data transmission request from the host computer 300 to the printer 100.

When the printer 100 is used in an ink billing system and the ink shot count and print result information are sent regularly, for example, to the host computer 300, the host computer 300 or a transaction server in communication with the host computer 300 can be configured to bill only for the ink that was consumed for successfully printed print jobs, and the ink billing system is thus fair to the user.

A job ID selection value indicating the print job(s) for which information is to be returned is also contained in the job data transmission request, and the job data manager 180 of the printer 100 sends the ink consumption and print result information linked to the job specified by the job ID selection value to the host computer 300. The user can therefore easily retrieve the ink shot count used for printing each print job by sending a job data transmission request specifying a particular job ID from the host computer 300, and can use this information to reduce the printing cost in an ink billing system, for example.

The printer 100 in this embodiment is described as being in communication with a single host computer 300, but the printer 100 could be connected to a LAN or other network for use by a plurality of host computers.

An arrangement in which the printer 100 is used in connection with a plurality of host computers is described below as a variation of the preferred embodiment of the invention.

Figure 6:
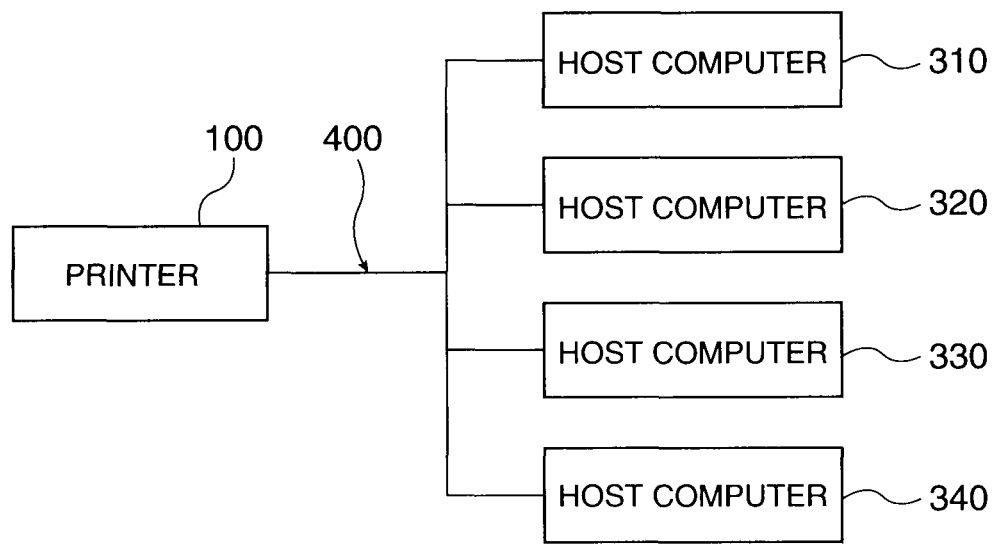
FIG. 6 is a block diagram of an alternative arrangement having multiple host computers connected to a single printer.

FIG. 6 is a schematic block diagram showing a printer 100 connected to a plurality of host computers, and FIG. 7 shows an example of the print job information stored in the job data memory 190 in this embodiment of the invention. In this embodiment, each job ID entry has a corresponding device ID entry.

As shown in FIG. 6, a LAN or other network 400 connects the printer 100 to a plurality of host computers 310, 320, 330, 340. The basic arrangement of the printer 100 is identical to the printer 100 described above, and further description is therefore omitted here.

Each of the host computers 310, 320, 330, 340 sends print jobs to the printer 100 for printing, and each host computer 310, 320, 330, 340 includes in the print job information a device ID identifying which host computer sent the print job. This device ID uniquely identifies the transmitting device so that, for example, if the host computer 310 sends the print job the host computer 310 that sent the print job can be identified and thus differentiated from the other host computers 320, 330, 340. The device ID could be a number unique to each device, such as the manufacturer serial number, or a network address, such as an IP address, that uniquely identifies each device on the network.

When the printer 100 receives a print job containing a device ID and the job data manager 180 then stores the ink shot count in the job data memory 190, the ink shot count is stored linked to the print job ID and the device ID contained in the print job received from the host computer as shown in FIG. 7. The printer 100 can therefore quickly identify which host computer sent the print job.

The host computers 310, 320, 330, 340 also add the device ID identifying the host computer 310, 320, 330, 340 in the job data transmission requests sent by the host computers to the printer 100. When the printer 100 receives a job data transmission request, the job data manager 180 finds the requested print job information based on the job ID and the device ID contained in the job data transmission request, and sends the ink consumption and print result information in the requested print job information to the host computer 310, 320, 330, 340 that sent the request.

A job data transmission request specifying both the device ID and job ID is thus sent to the printer 100 in this embodiment of the invention, and the printer 100 finds the desired print job information based on these device ID and job ID values. As a result, even if plural host computers 310, 320, 330, 340 assign the same job ID to print jobs sent to the printer 100, duplicate print job records will not be stored in the job data memory 190 of the printer 100 because the device IDs differ, and each print job can still be uniquely identified. Therefore, when a job data transmission request is received from one of the host computers, the printer 100 will not accidentally return the ink shot count and print result information for a print job sent from a different host computer, and the printer of the invention can therefore be used in a network environment to the same effect described above.

The device ID and job ID are separate entities above, but in an environment in which there is no duplication of print job IDs, such as when device identification information for identifying a particular device is contained in the job ID, the job ID can be used alone as the key value for retrieving print job information in the same way as described in the first embodiment above.

The printer 100 in the first embodiment and the variation described above has a printing evaluator 175, but if the user is billed for the total ink shot count regardless of whether the print result was successful, the printing evaluator 175 could be omitted. The process for recording the print job information in this situation is described next with reference to FIG. 8.

Figure 8:
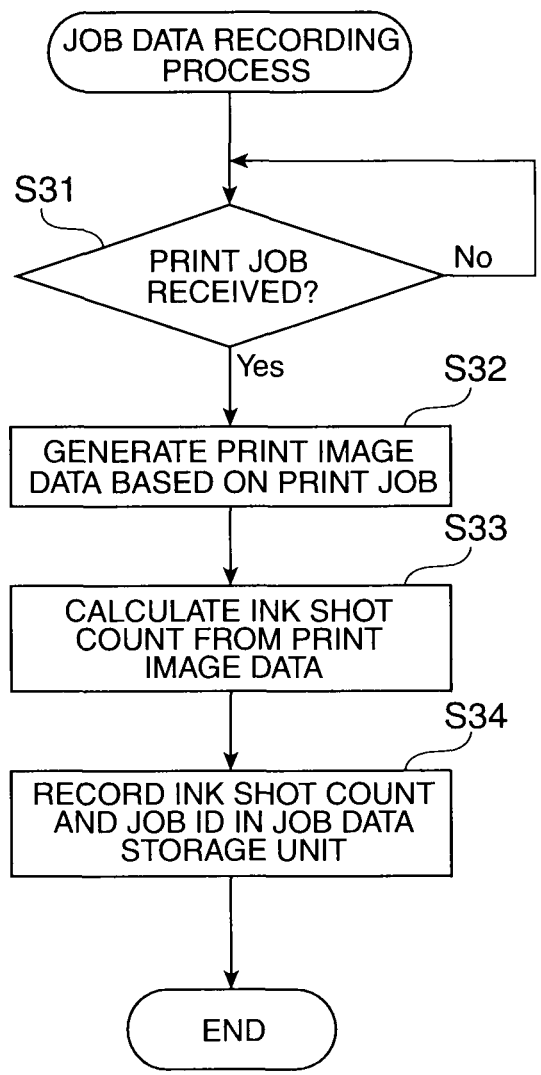
FIG. 8 is a flow chart of the print job information recording process when the host computer does not have a printing evaluator.

FIG. 8 is a flow chart of the process for recording the print job information when the printer does not have a printing evaluator.

The printer 100 waits until the receiver 110 receives a print job sent from the host computer 300 (step S31). When a print job is received, dot pattern data is generated based on the received print job as the print image data used for printing, and is stored in the print buffer 140 (step S32). The print controller 150 then drives the print head to print on the roll paper (form an image on the paper) according to this dot pattern data and thereby issue a coupon while the ink shot count converter 170 also calculates the ink shot count used for printing based on the dot pattern data (step S33). The job data manager 180 then records the calculated ink shot counts with the job ID contained in the received print job as the print job information in the job data memory 190 (step S34). The job information recording process then ends.

Each time a print job is printed in this embodiment of the invention, the ink shot count consumed by the print job is recorded together with the print job ID in the printer 100. When a print job request is then received from the host computer 300, the ink shot count for the print job specified in the print job request is sent from the printer 100 to the host computer 300 via transmitter 200.

The job data manager 180 can therefore send only the ink shot count used for printing to the host computer in response to a print data transmission request received from the host computer 300, and determining whether a print job was successfully printed need not be determined in an ink billing system that charges for the total ink shot count regardless of whether printing is successful. The process of recording the print job information can therefore be completed more quickly, and the data transmission volume can be reduced when transferring print job information from the printer 100 to the host computer 300.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An inkjet printer that is in communication with a host computer and that prints based on a print job sent from the host computer, the inkjet printer comprising:
   a job data memory that stores information relating to print jobs;
   a receiver that receives the print job from the host computer;
   a print controller that prints on paper using a predetermined ink according to the print job;
   an ink shot count converter that calculates an ink shot count used to print the print job, wherein the ink shot count only includes the number of ink shots actually discharged onto the paper for printing;

a printing evaluator that verifies that the ink shot count used to print the print job corresponds to a desired print output;

a job data manager that records in the job data memory a job ID for the print job and the ink shot count used to print the print job linked to device identification information that is contained in the print job and identifies a particular host computer that sent the print job linked to the verification; and wherein the job data manager sends the ink shot count used for printing to the host computer in response to a job data transmission request received from the host computer;

the job data transmission request contains a job ID selection value that specifies a print job;

the job data manager sends the ink shot count linked to a job ID corresponding to the job ID selection value to the host computer.

2. The inkjet printer described in claim 1, wherein the ink shot count converter separately calculates the ink shot count for each color of ink that is discharged for printing based on dot pattern data generated from the print job.

3. The inkjet printer described in claim 1, wherein the job data manager sends device identification information specified in the job data transmission request to the host computer in response to the job data transmission request received from the host computer.

4. The inkjet printer described in claim 1, wherein the ink shot count converter separately calculates the ink shot count for each color of ink that is discharged for printing based on dot pattern data generated from the print job.

5. The inkjet printer described in claim 1, wherein the job data manager sends the print result to the host computer in response to the job data transmission request received from the host computer.

6. The inkjet printer described in claim 5, wherein:
the job data manager sends the print result linked to the job ID corresponding to the job ID selection value to the host computer.

7. The inkjet printer described in claim 1, wherein the job data manager sends the print result linked to the job ID and device identification information specified in the job data transmission request to the host computer in response to the job data transmission request received from the host computer.

8. An ink billing system for determining an ink shot count and print result using an inkjet printer described in claim 1, and for billing according to the ink shot count, wherein:
the ink shot count is counted and billed only if the print result is successful.

9. A control method for an inkjet printer that is in communication with a host computer and that prints based on a print job sent from the host computer, the control method comprising:
receiving the print job from the host computer;
printing on paper using a predetermined ink according to the print job;
calculating an ink shot count used to print the print job, wherein the ink shot count only includes the number of ink shots actually discharged onto the paper for printing;
verifying that the ink shot count used to print the print job corresponds to a desired print output;
recording information related to each print job in a job data memory, the recorded print job information including a job ID for the print job and the ink shot count used to print the print job linked to device identification information that is contained in the print job and identifies a particular host computer that sent the print job linked to the verification; and
sending the ink shot count used for printing to the host computer in response to a job data transmission request received from the host computer; and wherein
the job data transmission request contains a job ID selection value that specifies a print job; and
sending the ink shot count includes sending the ink shot count linked to the job ID corresponding to the job ID selection value to the host computer.

10. The inkjet printer control method described in claim 9, wherein calculating the ink shot count separately includes calculating the ink shot count for each color of ink that is discharged for printing based on a dot pattern data generated from the print job.

11. The inkjet printer control method described in claim 9, further comprising:
sending device identification information specified in the job data transmission request to the host computer in response to the job data transmission request received from the host computer.

12. The inkjet printer control method described in claim 9, wherein:
calculating the ink shot count separately includes calculating the ink shot count for each color of ink that is discharged for printing based on the dot pattern data generated from the print job.

13. The inkjet printer control method described in claim 9, further comprising:
sending the print result to the host computer in response to the job data transmission request received from the host computer.

14. The inkjet printer control method described in claim 13, wherein:
sending print job information sends the print result linked to the job ID corresponding to the job ID selection value to the host computer.

15. The inkjet printer control method described in claim 9, wherein:
sending print job information sends the print result linked to the job ID and device identification information specified in the job data transmission request to the host computer in response to the job data transmission request received from the host computer.

* * * * *

UNITED STATES PATENT AND TRADEMARK OFFICE
CERTIFICATE OF CORRECTION

| | | |
|---|---|---|
| PATENT NO. | : 8,553,243 B2 | Page 1 of 1 |
| APPLICATION NO. | : 11/624558 | |
| DATED | : October 8, 2013 | |
| INVENTOR(S) | : Kenichi Murahashi et al. | |

It is certified that error appears in the above-identified patent and that said Letters Patent is hereby corrected as shown below:

Title Page:

Item (73), Assignee: change "Seiko Epsoh Corporation, Tokyo (JP)"
to --Seiko Epson Corporation, Tokyo (JP)--.

Signed and Sealed this
Twenty-third Day of September, 2014

Michelle K. Lee
*Deputy Director of the United States Patent and Trademark Office*